Jan. 6, 1970 R. H. DYCK 3,488,636

OPTICALLY PROGRAMMABLE READ ONLY MEMORY

Filed Aug. 22, 1966

INVENTOR.
RUDOLPH H. DYCK
BY Norman N. Kunitz
Edgar L. Bowers
ATTORNEYS

United States Patent Office 3,488,636

Patented Jan. 6, 1970

3,488,636

OPTICALLY PROGRAMMABLE READ ONLY MEMORY

Rudolph H. Dyck, Palo Alto, Calif., assignor to Fairchild Camera and Instrument Corporation, Syosset, N.Y., a corporation of Delaware Filed Aug. 22, 1966, Ser. No. 573,955
Int. Cl. G11b; G11c; G01n *21/30*
U.S. Cl. 340—173 13 Claims

ABSTRACT OF THE DISCLOSURE

A monolithic semiconductor photosensing array provides fast random accessing and is suitable as a large-scale memory. Each cell of the array comprises a relatively large photosensing junction and two small switching diodes. Programming is accomplished by the use of light and an overlying mask.

This invention relates to a read only memory and more particularly to an optically programmable memory system having a memory array which preferably is in the form of a semiconductor monolithic structure, i.e., constructed using integrated circuit techniques.

In the computer and control arts a need often exists for a programmed or programmable memory. Various memory schemes, such as capacive or magnetic memory arrays, have been successfully built and used in the past. However, with the present state of the electronic technology wherein memories are called upon to act at increasingly higher frequencies or shorter response times, and wherein memories which are increasingly smaller in size are desired, the previously used magnetic and capacitive memories are usually either too slow, too expensive, or cannot be readily reduced in physical size to within the desired limits.

One type of previously known memory which is both inexpensive and fast and readily lends itself to miniaturization is the conventional two-dimensional diode array or diode matrix memory. In such a memory, each crossing or junction or row and column conductors is either provided with a diode or left open. Such a memory is essentially a fixed content memory and a change can only be made by some mechanical operation such as throwing a switch or later inserting or removing a diode. One example is described in U.S. Patent No. 3,191,151, assigned to the same assignee as this invention. While a diode memory matrix of the type described in aforesaid Patent 3,191,151 is eminently satisfactory for many applications, there frequently arises a need for a memory system having a capability of readily and speedily adjusting the matrix configuration or content.

In order to retain the favorable properties of the diode matrix memory, and yet provide for the ability to change the content of the memory without requiring the addition of complicated electrical switching circuitry, this invention provide a way of optically programming a diode array. Moreover, so as not to sacrifice the present day requirements of size and speed, the optical programming is carried out by making use of the well-known phenomenon that a semiconductor P-N junction which is biased to its high impedance state will produce a current in response to excitation by radiant energy, e.g., ultraviolet, infrared, or visible light.

Briefly, an optically programmable memory system according to the invention comprises a plurality of back-to-back connected diode pairs arranged in an array of rows and columns with each of said diode pairs being connected between the associated row and column conductors; a separate row and a separate column conductor for each row and each column respectively of said array being provided. A corresponding plurality of semiconductor photodetectors, e.g., phototransistor, a photosensitive field effect transistor or preferably a photodiode, are also provided with each photodetector being associated with a separate diode pair. Each photodetector has one electrode connected to the common junction of the corresponding diode pair and the remaining electrode connected, preferably in common, to a point of bias potential which will bias the light sensitive P-N junction of the photodector to its high impedance state. Means are provided for selectively applying biasing potentials to the row conductors to selectively allow the photocurrents generated by radiant energy or light impinging on the photodetectors to flow into said column conductors. The column conductors in turn are provided with a means which is responsive to the current flow in the column conductors as a usable output from the memory.

The memory array utilized in the memory system according to the invention, i.e., the array of back-to-back diodes with their associated photodetectors, lends itself readily to manufacture in a monolithic structure form. Accordingly, the preferred embodiment of the memory array according to the invention, which utilizes photodiodes for the photodectors, briefly comprises a body of semiconductor material of a first conductivity type having formed therein adjacent to a single major surface thereof a plurality of spaced regions of opposite conductivity type with said plurality of regions being arranged in an array of rows and columns. Each of said regions in turn, has a pair of regions formed therein having said first conductivity type. At least one of the pair of regions of the first conductivity type is provided with a barrier against impinging radiant energy. Each P-N junction formed between a region of opposite conductivity type and the semiconductor body forms a photodiode or photodetector of the array. Accordingly, the surface area of the region of the opposite conductivity type is preferably large with respect to the surface area of the pair of regions formed therein to provide the array with the maximum sensitivity to radiant energy or light excitation. The P-N junctions formed between the regions of first conductivity type and the region of opposite conductivity type form the back-to-back diodes and accordingly, the regions of first conductivity type are connected to the associated row and column conductors.

The invention and the advantages thereof will be more clearly understood from the following detailed description when taken in conjuction with the accompanying drawings wherein.

Figure 1:
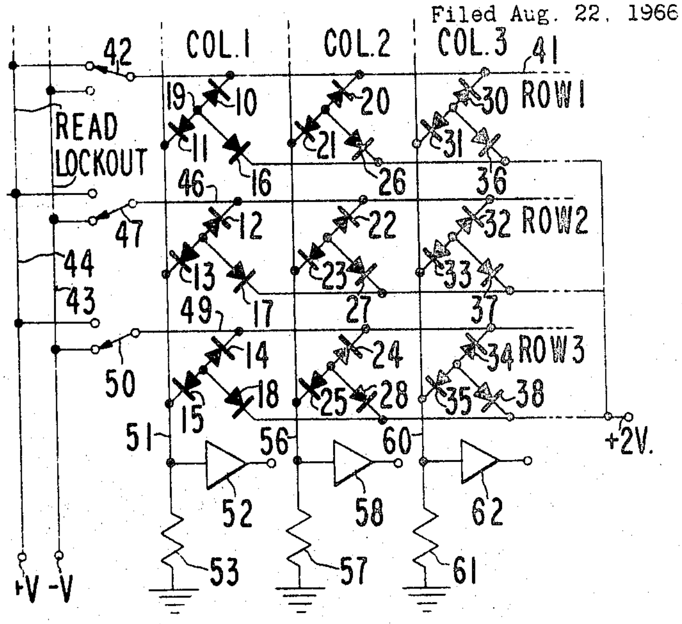
FIGURE 1 is a schematic circuit diagram of a memory system according to the invention.

Referring now to FIGURE 1 there is shown a schematic circuit diagram of a two-dimensional memory system programmable by radiant energy according to the invention having a plurality of diode pairs connected back-to-back with a common junction and arranged in an array of rows and columns. Although a 3 x 3 array is illustrated, it is to be understood that this is by way of example only and that in a practical application of the system any desired number of rows and columns may be used. As indicated in the array of FIGURE 1, the pairs of back-to-back diodes in column 1 are formed by diodes 10 and 11, diodes 12 and 13, and diodes 14 and 15 respectively. Similarly, the back-to-back diode pairs in column 2 are formed by diodes 20 and 21, 22 and 23, and 24 and 25, while those in column 3 are formed by diodes 30 and 31, 32 and 33, and 34 and 35 respectively.

Associated with each one of the pairs of back-to-back diodes in column 1 is one of three semiconductor photodetectors 16, 17, 18, having one of its two electrodes connected to the common junction of the corresponding diode pair, e.g., photodetector 16 is connected to the common junction 19 of diodes 10 and 11. Similarly, photodetectors 26, 27, and 28 and photodetectors 36, 37, and 38 are associated with and connected to the corresponding diode pairs in columns 2 and 3 respectively. The remaining electrodes of photodetectors 16–18, 26–28, and 36–38, are connected, preferably in common, to a point of bias potential (designated as +2V for reasons which will become apparent below) which biases the radiant energy sensitive P-N junction of each of the photodetectors to its high impedance state. By radiant energy sensitive P-N junction it is understood to mean the junction in the device which is principally responsive to radiant energy impinging thereon. For example, in a diode it is the anode-cathode junction, in a planar transistor it is the collector-base junction, whereby the transistor is maintained in its high gain state, and in a field effect phototransistor it is the gate junction. In the illustrated embodiment, the bias or reference potential is designated as a positive voltage due to the particular manner in which the photodetectors are connected into the circuit. However, it should be understood that the polarity of the photodetectors and that of the bias voltage may be reversed without affecting the operation of the system so long as the condition concerning the biasing of the radiant energy sensitive junction is met.

Although, as indicated above, the photodetectors may be three layer semiconductor structures, e.g., phototransistors, or two layer semiconductor structures, e.g., photodiodes, preferably as shown in the figure and for simplification of the preferred embodiment of the invention to be explained below, the photodetectors are photodiodes. Additionally, the diodes utilized in the back-to-back diode pairs are also preferably semiconductor diodes which, for reasons which will also become apparent from the discussion of the preferred monolithic structure for the memory, are connected such that the commonly connected electrodes of the diode pair and its associated photodetector are of the same conductivity type.

The memory system of the invention further comprises separate row and column conductors associated with each row and each column respectively of the diode array with each of the diode pairs being connected between a row conductor and a column conductor. Specifically there is provided, connected to the free end of each of the diodes 10, 20, and 30, a row conductor 41 which is connected by a switch 42 to either a lockout bus 43 or a read bus 44. As shown in the figure, the switch 42 is positioned to connect the row conductor 41 to the read bus 44 whereby a potential V, which in the illustrated embodiment is a positive potential (+V) due to the polarity of the diodes, the photodetector and the bias potential applied to the photodetector, is applied to the row conductor to bias the diodes 10, 20, and 30 to their high impedance state. Connection of the row conductor 41 to the lockout bus 43 via switch 42 will result in the application of a potential V, in the illustrated case a negative potential (−V), to the diodes 10, 20, and 30 which will tend to bias them to their low impedance state.

A second row conductor 46 connects all of the free electrodes of diodes 12, 22, and 32 via switch 47 to either the lockout bus 43 or the read bus 44 to bias the diodes connected to the row conductor 46 to either their low impedance or their high impedance state, respectively. Similarly, a third row conductor 49 connects the diodes 14, 24, and 34 via a switch 50 to either the lockout bus 43 or the read bus 44 to cause the diodes 14, 24, and 34 to be biased to either their low or their high impedance states, respectively.

Connected to the free terminal of each of the diodes 11, 13, and 15 of column 1 is a first column conductor 51 which constitutes the output line from the first column of the memory array. Any current flowing in column conductor 51 is detected by an output device such as amplifier 52 which is connected across column 1 load resistance 53. A second column conductor 56 connects all of the free terminals of diodes 21, 23, and 25 to a second column load resistor 57 having an output device 58 connected across it. Similarly, column conductor 60 connects the free terminal of diodes 31, 33, and 35 in common to the column load resistor 61 having output device 62 connected across it.

Figure 2:
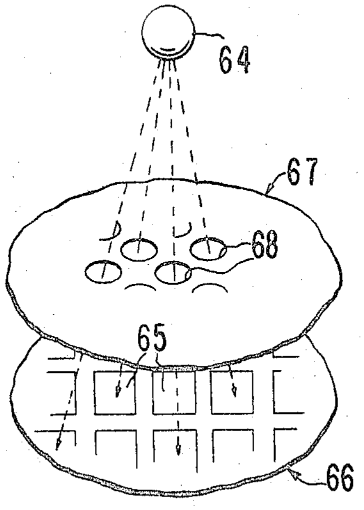
FIGURE 2 is a schematic representation illustrating a manner by which the memory system according to the invention may be optically programmed.

In order to explain the operation of the memory array described, a brief description of a method of programming a photodetector array is believed to be in order at this time. As shown in FIGURE 2, a source of light 64, which may be of any desirable design, is positioned so that it will normally illuminate all of the photodetectors, indicated generally by the reference numeral 65, in an array 66. Positioned between the source 64 and the array 66 is an optical mask which may for example consist of plate 67 of metal or some other opaque substance having a plurality of openings 68 at selected locations therein. By proper selection of the location of the openings 68 in the plate 67, and by positioning the mask relative to the surface of the array and/or adjusting the size of the openings 68 so that the light passing through any single opening will illuminate only one photodetector 65, any combination of photodetectors 65 may be illuminated; thus programming the array 66 in accordance with the desired information.

Turning now to the explanation of the operation of the memory system of FIGURE 1, let us assume that the array has been preprogrammed by means of a light source and an optical mask as shown in FIGURE 2, and that all of the switches 42, 47, and 50 are connected to the lockout bus 43. In this condition, a negative potential is applied to each of the row conductors 41, 46, and 49 whereby all of the diodes connected to that bus are biased to their low impedance state. Additionally, because of the specific circuit arrangement, the application of a negative bias to the row conductors causes each of the remaining diodes in the back-to-back diode pairs, i.e., the diodes connected to the column conductors, to be biased to its high impedance state. Accordingly, any photocurrents generated by an illuminated photodetector, which current will flow in a direction toward the common junction of the back-to-back diodes and the photodiodes, will be directed via the low impedance state diodes into the associated row conductor and out of the array. Accordingly, the biasing of the diodes connected to the row conductors to their low impedance state by connecting the row conductors to bus 43 locks out or prevents any photocurrents generated by the associated photodetectors from flowing into the column conductors, and hence, no output from the memory is derived.

When it is desired to interrogate or readout a single row of the memory, the switch 42, 47, or 50 of the row selected for readout, in the illustrated example row 1, is switched to its read position whereby a positive potential +V is applied to the selected row conductor 41 to bias the diodes 10, 20, and 30 connected thereto to their high impedance state. Simultaneously, the diodes 11, 21, and 31 are biased to their low impedance state. Hence, any photocurrents generated due to the photodetectors 16, 26, or 36 being illuminated will pass via the diodes 11, 21, and 31 to the associated column conductor 51, 56, or 60 respectively for detection, and the simultaneous readout of all the photodetectors of row 1 is achieved. Thus, it can be easily seen, the memory array according to the invention performs in a manner very similar to a conventional diode array memory but with a programmable content, i.e., the absence or presence of illumination on any of the photodetectors in a selected row determines whether the crossing or intersection of the respecitve row and column conductors appears as an open or closed path.

Figure 3:
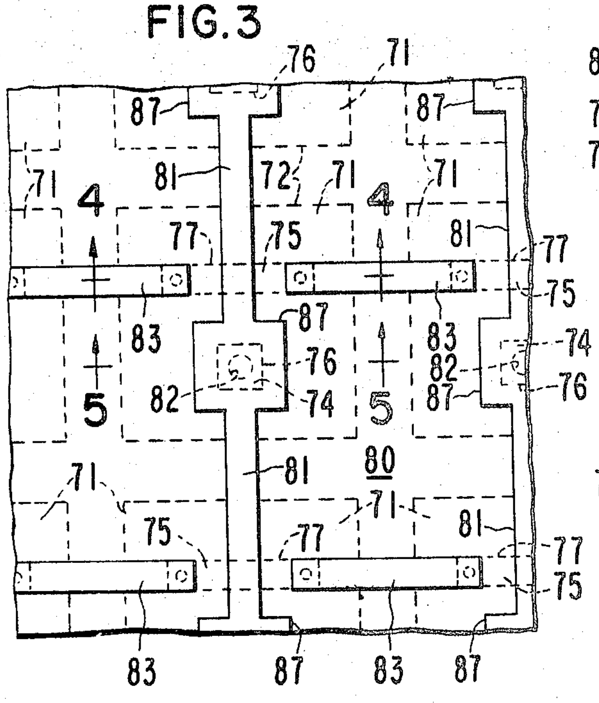
FIGURE 3 is a plan view of a portion of the preferred embodiment of the memory array according to the invention, i.e., as it would appear in a monolithic structure.
Figure 4:
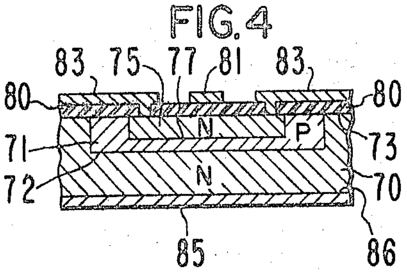
FIGURE 4 is a sectional view taken along the line 4—4 of the FIGURE 3.
Figure 5:
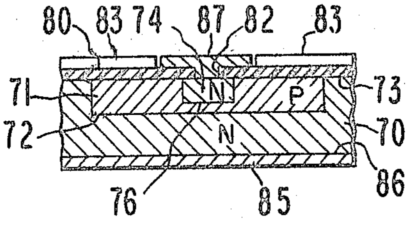
FIGURE 5 is a sectional view taken along the line 5—5 of FIGURE 3.

As indicated above, the memory array for the system just described lends itself readily to manufacture as a monolithic structure by standard integrated circuit techniques. FIGURES 3 to 5 illustrate a preferred embodiment of a monolithic structure of the memory according to the invention. The structure illustrated in the figures is a portion of the display corresponding roughly to one crossing of the memory, i.e., one back-to-back diode pair and its associated photodetector, row conductor, and column conductor; each of the other crossings in the memory having essentially the same structure as that illustrated.

As shown in FIGURES 3 to 5 the memory array includes a body or substrate 70 of semiconductor material, such as silicon which is preferably monocrystalline, of a first conductivity type which typically may be an N type, formed by diffusion of an impurity such as antimony, arsenic, or phosphorus. Formed within the body 70 are a plurality of relatively deep (e.g., 6 microns) spaced first semiconductor regions 71 of a conductivity type opposite from that of body 70 (P type in this example) which form a plurality of separate planar P-N junctions 72 with the body (i.e., the individual P-N junctions extend to a single major surface 73 of the semiconductor body). Since the P-N junctions 72 formed between the region 71 and the body 70 constitute the photosensitive junctions and hence the photodetectors of the memory array, the regions 71 are made as large as possible for a given array density. Although the shape of the regions 71 is shown as rectangular, this is by way of example only and it is to be understood that other shapes such as circular shapes may be used if desired.

Formed within each of the regions 71 of the array are second and third semiconductor regions 74 and 75 having said first conductivity type (in the example N type) which form planar P-N junctions 76 and 77 respectively with the region 71. The regions 74 and 75 are normally kept as shallow as possible, for example on the order of 2 microns, to minimize the current gain across the P-N junctions 76 and 77 due to transistor action and thereby minimize the switching time for the junction. It is to be understood however that if current gain is a desired feature for the resulting memory, then the increased gain may be achieved by using deeper diffusions for the regions 74 and 75. However, it must be realized that this increased current gain is achieved at the expense of switching speed for the diodes which are formed between the regions 74 and 75 and the regions 71 and correspond to the pair of back-to-back diodes of FIGURE 1.

Overlying the surface 73 is a layer of insulating material 80 which is constructed to transmit light therethrough. In the case of a silicon body 70, such an insulating material may be silicon dioxide, which is transparent to light. The layer 80 functions not only as an insulating layer but also protects the junctions 72, 76, and 77 from environmental contaminants.

Adherent to the surface of the insulating layer 80, are a plurality of column conductors 81 which are formed by thin metal layers. Each of the column conductors 81 overlies all of the regions 74 in the particular column of the memory with which the particular conductor 81 is associated, and is ohmically connected to the underlying regions 74 via openings 82 in the insulating layer 80.

In order to connect the regions 75 to the respective row conductors, another layer of insulating material may be deposited on top of the column conductors 81 and similar metal row conductors deposited on the surface thereof and connected to the regions 75 via openings in the insulating layers. However, to avoid two layer metallization, in the preferred embodiment of the invention, the regions 75 are located beneath the column conductors 81 and are formed such that they extend on either side of the column conductors. The regions 75 thereby act as underpasses for the column conductors, as described in U.S. Patent No. 3,199,002 assigned to the same assignee as this invention. The row conductors for the array may then be formed by mounting or adhering a plurality of thin film metal conductors 83 on the surface of the insulating layer 80 with the plurality of conductors 83 being spaced from the column conductors and ohmically connected to and interconnecting adjacent areas 75 in any row. A metal layer 85 is also provided on the second major surface 86 of the body 70 and serves as the electrical contact for connecting the junctions 72, which operate as the photodiodes of the detector array, to the point of biasing potential.

It should be noted that since the insulating layer 80 is transparent to light, that the regions 74 and 75 and the portions of region 71 near junctions 76 and 77 would normally be exposed to light excitation and hence would tend to absorb the light energy and cause the junctions 76 and 77 to function as photojunctions, i.e., produce useable photocurrents when properly biased. Although such action by a junction 77 (corresponding, for example, to the diode 10 in FIGURE 1) would present no problem to the operation of the memory system shown in FIGURE 1, the generation of photocurrents by a P-N junction 76 (corresponding, for example, to the diode 11 of FIGURE 1) would result in erroneous currents being transmitted to the current responsive device connected to the associated column conductor. Accordingly, some means or barrier must be provided to permanently shield from impinging light energy at least the regions 74, whereby the major photosensitive area of junctions 76 would be shielded. Preferably the portion of region 71 adjacent the junctions 76 is also shielded from light energy impinging thereon in order to further reduce the photosensitivity of the junctions 76. The extent to which the shielding preferably extends beyond junctions 76 and over region 71 depends firstly on the effective minority carrier diffusion length, which may be controlled by gold-doping, trailoring the coefficient for surface recombination, tailoring the built-in diffusion field, etc., and depends secondly on the number of elements in the column and the amount of unwanted signal which can be tolerated.

Although any means for producing the light shielding may be utilized, e.g., an opaque mask on the layer 80, as shown in FIGURES 3 to 5 the shielding means is preferably in the form of enlarged portions 87 of the column conductors 81 which completely cover the regions 74 and extends beyond the junctions 76 over a portion of region 71. Preferably the portions 87 extend beyond the junctions 76 at least one minority carrier diffusion length.

The above described monolithic device may be formed by well-known semiconductor processes. For example, the regions 71, 74, and 75 and the oxide layer 80 may be formed by photoengraving and diffusion techniques such as described in U.S. Patent No. 3,064,167 issued Nov. 13, 1962 to J. A. Hoerni. Similarly, the forming of the leads or conductors 81 and 83 and their associated contacts may use processes such as described in U.S. Patent 2,981,877 issued Apr. 25, 1961 to R. N. Noyce.

As an illustration of the size of a monolithic type array according to the invention, the array may for example be an 8 x 40 array with 5 mils (0.005 inch) between centers of the regions 71, each of which has an area of 16 square mils, i.e., 4 mils on each side. Each of the regions 74 may, for example, have an area of ¼ square mil (½ mil on each side) and each of the areas 75 an area of 1 square mil (½ x 2 mils). A diode array according to the invention with these dimensions can have a row sample time of as little as 50 nanoseconds.

From the above detailed description of the invention, it can be seen that an improved and novel optically programmable memory system and a monolithic construction of a memory array therefore have been invented. Obviously, however, various modifications of the disclosed invention are possible in light of the above disclosure without departing from the spirit of the invention. Accordingly, the invention is to be limited only as indicated by the scope of the appended claims and the reasonable equivalents thereof.

What is claimed is:

1. A memory system programmable by radiant energy comprising:
- a plurality of diode pairs connected back-to-back with a common junction arranged in any array of rows and columns;
- separate row and column conductors associated with each row and each column respectively of said diode array with each of said diode pairs being connected between a row conductor and a column conductor;
- a corresponding plurality of semiconductor photodetectors arranged in an array of rows and columns, each of said photodetectors being connected between the common junction of the corresponding diode pair and a point of bias potential for biasing the radiant sensitive P-N junction of the photodetector in its high impedance state;
- means coupled to said row conductors for selectively allowing the photocurrents generated by radiant energy impinging on associated ones of said photodetectors to flow in said column conductors; and
- means connected to said column conductors responsive to the current flow therein.

2. The memory system of claim 1 where said means for selectively allowing the generated photocurrents to flow in said column conductors comprises:
- means for applying a potential to the row conductor associated with the row of the array which has been selected for readout to bias the diode connected thereto in each of the diode pairs of the selected row to its high impedance state, whereby current generated by each photodetector of said selected row is transmitted via the remaining diode in the respective diode pair to the associated column conductor; and
- means for applying a potential to the remaining row conductors to bias the diode connected thereto in each of the diode pairs in the said remaining rows of said diode array to its low impedance state, whereby photocurrent generated by each photodetector not associated with the row selected for readout is transmitted to the associated row conductor.

3. The system of claim 1 wherein said back-to-back diodes are semiconductor diodes and wherein at least the diode in each pair which is connected to the associated column conductor is protected from radiant energy impinging thereon.

4. The system of claim 3 wherein the conductivity type of the commonly connected electrodes of each of the diodes in a diode pair and its associated photodetector is the same.

5. The system of claim 4 wherein said photodetectors are photodiodes.

6. The system of claim 4 wherein said arrays are in the form of a semiconductor structure wherein each group including a photodetector and an associated back-to-back diode pair comprises:
- a body of a first conductivity type;
- a first region of opposite conductivity type formed within said body and forming a first P-N junction therewith with said P-N junction extending to a major surface of said body;
- second and third regions of said first conductivity type formed within said first region and forming separate P-N junctions therewith which extend to said major surface.

7. The system of claim 6 wherein said body of a first conductivity type is common to each of said groups.

8. A solid state device responsive to radiant energy comprising:
- a semiconductor body of a first conductivity type;
- a first region of opposite conductivity type formed within said body and forming a first P-N junction therewith with said P-N junction extending to a major surface of said body;
- second and third regions of said first conductivity type formed within said first region and forming separate P-N junctions therewith which extend to said major surface;
- shielding means overlying and adhering to a selected portion of the major surface for preventing radiant energy from impinging on at least one of said second and third regions; and,
- electrical contacts individually ohmically connected to said body and said second and said third regions.

9. The device of claim 8 wherein said second and third regions have relatively small surface areas with respect to the surface area of said first region, and wherein said shielding means comprises enlarged portions of selected electrical contacts.

10. A monolithic semiconductor memeory programmable by radiant nergy including a plurality of devices according to claim 8 having a common semiconductor body and arranged in rows and columns, and having separate row and column conductors for each row and column respectively of said array with each of the second regions of said devices in any column being ohmically connected to the associated column conductor and each of the third regions of said devices in any row of said array being ohmically connected to the associated row conductor.

11. The device of claim 10 including a coating of light transmissive insulating material on said major surface and wherein said row and column conductors comprise a plurality of thin films of metal adhering to said coating and insulated from one another.

12. The device of claim 10 including:
- means coupled to the electrical contact connected to said body for biasing said first P-N junctions to their high impedance state;
- means coupled to said row conductors for selectively allowing the photocurrents generated by radiant energy impinging on associated ones of said first P-N junctions to flow in said column conductors; and
- means connected to said column conductors responsive to the current flow therein.

13. A semiconductor diode memory programmable by radiant energy comprising:
- a body of monocrystalline semiconductor material of a first conductivity type;
- a plurality of spaced first regions of opposite conductivity type formed within said body and arranged in an array of rows and columns, each of said first regions forming a separate P-N junction with said body which extends to a single major surface of said body;
- a second region having a relatively small surface area relative to the surface area of said first region and of said first conductivity type located within each of said first regions and forming a second P-N junction which extends to said major surface;
- a layer of light transmissive insulating material located on said major surface;
- a separate thin film column conductor associated with each column of said array, each of said column conductors being adherent to the exterior surface of said insulating layer in overlying relationship to the said second regions of the associated column and being ohmically connected to the underlying second regions, each of said column conductors having sufficient width, at least at the portions thereof overlying the said second regions, for preventing radiant energy from impinging on said second P-N junctions;

a third region having a relatively small surface area with respect to that of said first region and of said first conductivity type located within each of said first regions and forming a third P-N junction which extends to said major surface, each of said third regions being in underlying relationship to the associated column conductor and extending on either side thereof; and, a plurality of thin film conductors arranged in rows and adherent to the exterior surface of said insulating layer in spaced relationship to said column conductors, said plurality of thin film conductors overlying the extended portions of said third regions and being ohmically connected thereto to electrically connect the adjacent third regions in each row of said array.

References Cited

UNITED STATES PATENTS

| | | | |
|---|---|---|---|
| 3,201,764 | 8/1965 | Parker | 340—173 |
| 3,218,613 | 11/1965 | Gribble | 307—238 |

TERRELL W. FEARS, Primary Examiner

U.S. Cl. X.R.

250—219; 307—238